United States Patent [19]

Bellanger

[11] Patent Number: 5,633,979
[45] Date of Patent: May 27, 1997

[54] SIGNAL PROCESSING SYSTEM INVOLVING A LEAST SQUARES METHOD

[75] Inventor: Maurice Bellanger, Paris, France

[73] Assignee: U.S. Philips Corporation, New York, N.Y.

[21] Appl. No.: 977,934

[22] Filed: Nov. 18, 1992

[30] Foreign Application Priority Data

Nov. 26, 1991 [FR] France ............................. 91 14586

[51] Int. Cl.$^6$ ............................. G10L 3/02; G10L 9/00
[52] U.S. Cl. ............................. 395/2.1; 395/2.28
[58] Field of Search ............................. 395/2, 2.13, 2.43, 395/2.78, 2.79; 381/36

[56] References Cited

U.S. PATENT DOCUMENTS

| | | | |
|---|---|---|---|
| 5,018,065 | 5/1991 | McWhirter et al. | 395/800 |
| 5,278,942 | 1/1994 | Bahl et al. | 395/2 |
| 5,323,335 | 6/1994 | Mitchell | 364/572 |

OTHER PUBLICATIONS

Kraus et al, "Asymptotic and empirical results on approximate maximum likelihood and least squares estimates for sensor array processing"; ICASSP 90. 1990 International Conference on Acoustics, Speech and Signal Processing, pp. 2795–2798 vol. 5, 3–6 Apr. 1990.

Liu, "On–line parameter identification algorithms based on Householder transformation"; IEEE Transactions on Signal Processing, pp. 2863–2871, vol. 41, iss. 9, Sep. 1993.

M.G. Bellanger et al., "The FLS–Qr Algorithm for Adaptive Filtering: The Case of Multichannel Signals", Signal Processing (22), (1991), pp. 115–126.

M.G. Bellanger, "Computational Complexity And Accuracy Issues In Fast Least Squares Algorithms For Adaptive Filtering", Proceedings of the 1988 International Symposium on Circuits & Systems; IEEE Computer Society Press.

*Primary Examiner*—Tariq R. Hafiz
*Attorney, Agent, or Firm*—Anne E. Barschall

[57] ABSTRACT

A signal processing system involving a least squares method where the system is structured around a microprocessor and includes memory zones 130, 140 and 250 which include Tables for facilitating the signal processing. Input signals are normalized before being applied to the Tables. Use of one of the Tables (130) is made easier by the normalization. The other Tables are involved in rotation processes in the selected least squares algorithm.

23 Claims, 5 Drawing Sheets

SIGNAL PROCESSING SYSTEM INVOLVING A LEAST SQUARES METHOD

The present invention relates to a signal processing system for implementing a least squares method, which utilizes rotation matrices $Q_a$ and $Q_\alpha$ which imply sinusoidal functions, this system comprising an input for receiving a sample $x(n+1)$ at the instant $n+1$, another input for receiving at the same instant a reference sample $y(n+1)$, calculation means operating in accordance with said processing system for minimizing a signal $e(n+1)$ that represents the difference between the received samples and the reference samples.

A system of this type may find interesting applications in the field of signal processing, more specifically, for echo cancellers used in data transmissions, for eliminating radio communication multipaths, and for the predictors which are capable of reducing the amounts of information signals for certain types of encoding, for example, for speech encoding.

The invention is adapted, more particularly, to the processing described in the following article published in the journal of Signal Processing No. 22, 1991: "The FLS-QR algorithm for adaptive filtering: The case of multichannel signals" by M. G. BELLANGER and P. A. REGALIA.

The invention proposes a system of the type mentioned above which presents good performance as regards robustness to round-off errors and also as regards rapidity.

Therefore, the invention is characterized, in that the calculation means comprise normalizing means for normalizing the input samples.

This first measure of the invention already provides the considerable advantage that the calculations that will follow will be carried out on numbers of which it is certain that they will remain compatible with the calculation formats of the commercially available processors.

A further characteristic feature of the invention according to which the system comprises Tables for evaluating the sinusoidal functions, cooperating with the calculation means, provides the additional advantage that these calculation means operate very rapidly.

The following description accompanied by the appended drawings, all given by way of non-limiting example, will make it better understood how the invention can be realised, in which.

Figure 1:
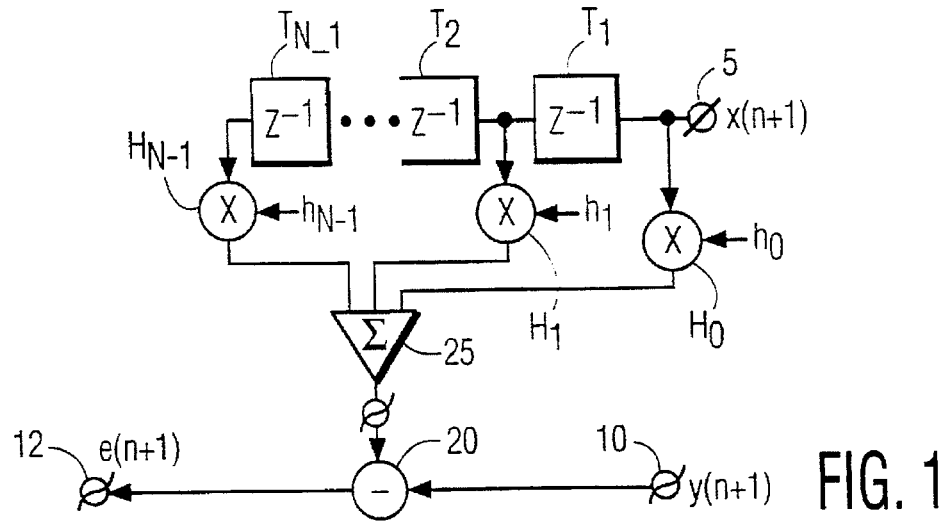
FIG. 1 represents the structure of the filter on which the invention is based.

Drawing FIG. 1 shows the basic circuit diagram of a transversal filter on the basis of which the invention is developed.

In this drawing FIG. 1 the samples of the signals to be processed are applied to a terminal 5 with a timing defined by 1/T; when an instant "n+1" is considered, the notation of these input samples will be $x(n+1)$; the filtering is carried out in response to the samples of a reference signal applied to the terminal 10, they are denoted by $y(n+1)$. The result of the filmring is a signal $e(n+1)$ which appears at a terminal 12. This signal $e(n+1)$ comes from a subtracter 20 which subtracts the signal $y(n+1)$ from a signal coming from an adder 25. This adder 25 adds the results of various multipliers $H_0$, $H_1$, ... $HN_{N-1}$ together. These multipliers are branched to the input terminal 5 and to the inputs of N delay elements $T_1$, ..., $TN_1$ respectively, producing each a delay equal to T. These multipliers $H_0$, $H_1$, ..., $H_{N-1}$ multiply by $h_0$, $h_1$, ..., $h_{N-1}$ respectively, the various samples delayed by the delay elements $T_1$, ..., $T_{N-1}$.

The least squares algorithm has for its aim to minimize the following cost function:

$$J(n+1) = \sum_{p=0}^{n+1} W^{n+1-p}[y(p) - X^T(p) \cdot H(n+1)]^2 \tag{1}$$

which corresponds to the norm of a vector Ve having components $e_p(n+1)$ (with p varying between 0 and n+1 inclusive):

$$e_p(n+1) = W^{(n+1-p)/2}[y(p) - X^T(p).H(n+1)] \tag{2}$$

In these equations:

W is an omission factor $0 \ll W < 1$ $H(n+1)$ is the vector of the coefficients $h_i$ $X(p)$ is the vector of the data $x(p), x(p-1), \ldots, x(p-N+1)$ and $X^T(p)$ is the transpose of the vector.

Now a matrix $X_N(n+1)$ is defined:

$$X_N(n+1) = \begin{bmatrix} x(n+1) & x(n) & \ldots & x(n+2-N) \\ W^{1/2}x(n) & W^{1/2}x(n-1) & \ldots & W^{1/2} \\ \ldots & \ldots & \ldots & \ldots \\ W^{n/2}x(1) & W^{n/2}x(0) & 0 & 0 \\ W^{(n+1)/2}x(0) & 0 & 0 & 0 \end{bmatrix} \tag{3}$$

A matrix $Q_N(n+1)$ of size $(n+2)\times(n+2)$ is searched for, so that:

$$Q_N(n+1) \cdot X_N(n+1) = \begin{bmatrix} 0 & 0 & \ldots & 0 \\ \cdot & \cdot & & \cdot \\ \cdot & \cdot & & \cdot \\ \cdot & \cdot & & \cdot \\ 0 & \ldots & \ldots & 0 \\ & T_N(n+1) & & \end{bmatrix} \tag{4}$$

where $T_N(n+1)$ is a triangular matrix. It should be observed that the matrix $Q_N(n+1)$ is a rotation matrix which retains the standard of the vectors and is furthermore orthogonal.

The triangular matrix $T_N(n+1)$ is written in the form of:

$$T_N(n+1) = \begin{bmatrix} 0 & \ldots & 0 & t_{N;N,N}(n+1) \\ 0 & \ldots & t_{N;N-1,N-1}(n-1) & t_{N;N-1,N}(n+1) \\ \cdot & & \cdot & \cdot \\ \cdot & & \cdot & \cdot \\ \cdot & & \cdot & \cdot \\ t_{N;1,1}(n+1) & \ldots & t_{N;1,N-1}(n+1) & t_{N;1,N}(n+1) \end{bmatrix} \quad (5)$$

When observing that the equation (3) can be written while causing a recursion to appear between $X_N(n+1)$ and $X_N(n)$:

$$X_N(n+1) = \begin{bmatrix} x(n+1) & x(n) & \ldots x(n+2-N) \\ & W^{1/2}X_N(n) & \end{bmatrix} \quad (3 \text{ bis})$$

the following recursion equation may thus be derived therefrom between the matrices $Q_N(n+1)$ and $Q_N(n)$:

$$Q_N(n+1) = \hat{Q}_N(n+1) \begin{bmatrix} 1 & 0 \\ 0 & Q_N(n) \end{bmatrix} \quad (6)$$

the matrix: $\hat{Q}_N(n+1)$ is a matrix formed by a series of N rotations which, applied to the equation (3 bis) renders the first line zero:

$$\hat{Q}_N(n+1) = \begin{bmatrix} \cos\theta_N & \ldots & -\sin\theta_N & \ldots & 0 \\ \cdot & & \cdot & & \cdot \\ \cdot & & \cdot & & \cdot \\ \sin\theta_N & \ldots & \cos\theta_N & \ldots & 0 \\ \cdot & & \cdot & & \cdot \\ \cdot & & \cdot & & \cdot \\ 0 & \ldots & 0 & \ldots & 1 \end{bmatrix} \ldots \begin{bmatrix} \cos\theta_1 & \ldots & 0 & \ldots & -\sin\theta_1 \\ \cdot & & \cdot & & \cdot \\ \cdot & & \cdot & & \cdot \\ 0 & \ldots & 1 & \ldots & 0 \\ \cdot & & \cdot & & \cdot \\ \cdot & & \cdot & & \cdot \\ \sin\theta_1 & \ldots & 0 & \ldots & \cos\theta_1 \end{bmatrix} \quad (7)$$

A further recursion of N may also be obtained, which narrows down to taking a vector $H(n+1)$ with $N+1$ components into consideration. The formula (4) is thus written as follows:

$$Q_{N+1}(n+1) \cdot X_{N+1}(n+1) = \begin{bmatrix} 0 & 0 & & \ldots & 0 \\ \cdot & & & & \cdot \\ \cdot & & & & \cdot \\ 0 & \ldots & & \ldots & 0 \\ & & T_{N+1}(n+1) & & \end{bmatrix} \quad (8)$$

where $X_{N+1}(n+1)$ follows from the matrix $X_N(n+1)$ by adding a left column of which the highest element is $x(n+1-N)$.

The triangulations then permit resolving the problem of least squares.

The vector $V_e$ whose components $e_p$ are given by the formula (2) is taken into consideration. The vector is multiplied to the left by the matrix $Q_N(n+1)$ for defining a vector:

$$V_{eq} = Q_N(n+1) V_e \quad (9)$$

where the components of this vector are: $e_{q,p}(n+1)$ and taking the equation (2) into consideration, one may write:

$$V_{eq} = Q_N(n+1) \begin{bmatrix} y(n+1) \\ \cdot \\ \cdot \\ \cdot \\ W^{(n-N)/2}y(N) \\ W^{(n+1-N)/2}y(N-1) \\ \cdot \\ \cdot \\ \cdot \\ W^{(n+1)/2}y(0) \end{bmatrix} - Q_N(n+1)X_N(n+1)H(n+1) \quad (10)$$

The vector $H(n+1)$ is determined in such a way that:

$$e_{q;N-1} = e_{q;N-2} = \ldots = e_{q;0} = 0 \quad (11)$$

The formula (9) is then written:

$$\begin{bmatrix} e_{q;n+1} \\ \cdot \\ \cdot \\ e_{q;N} \\ 0 \\ \cdot \\ \cdot \\ 0 \end{bmatrix} = Q_N(n+1) \begin{bmatrix} y(n+1) \\ \cdot \\ \cdot \\ W^{(n-N)/2}y(N) \\ W^{(n+1-N)/2}y(N-1) \\ \cdot \\ \cdot \\ W^{(n+1)/2}y(0) \end{bmatrix} - \begin{bmatrix} 0 & 0 & \ldots & 0 \\ \cdot & & & \cdot \\ \cdot & & & \cdot \\ 0 & 0 & \ldots & 0 \\ & T_N(n+1) & & \end{bmatrix} H(n+1) \quad (12)$$

One obtains:

$$Q_N(n+1) \begin{bmatrix} y(n+1) \\ \cdot \\ \cdot \\ \cdot \\ W^{(n-N)/2}y(N) \\ W^{(n+1-N)/2}y(N-1) \\ \cdot \\ \cdot \\ \cdot \\ W^{(n+1)/2}y(0) \end{bmatrix} = \begin{bmatrix} e_{q;n+1}(n+1) \\ \cdot \\ \cdot \\ \cdot \\ \cdot \\ e_{q;N}(n+1) \\ y_{q;N-1}(n+1) \\ \cdot \\ \cdot \\ \cdot \\ y_{q;0}(n+1) \end{bmatrix} \quad (13)$$

where:

$$Y_q(n+1) = \begin{bmatrix} y_{q;N-1} \\ \cdot \\ \cdot \\ \cdot \\ y_{q;0} \end{bmatrix} = T_N(n+1) \cdot H(n+1) \quad (14)$$

As the matrix $Q_N(n+1)$ retains the norm, the afore-described cost function is written as:

$$J(n+1) = \sum_{p=N}^{n+1} e_{q,p}^2(n+1) \quad (15)$$

One may also write:

$$e_{n+1}(n+1) = $$

$$[e_{n+1}(n+1), W^{1/2}e_n(n+1), \ldots, W^{n/2}e_0(n+1)] \begin{bmatrix} 1 \\ 0 \\ \cdot \\ \cdot \\ \cdot \\ 0 \end{bmatrix}$$

and taking the orthogonality of $Q_N(n+1)$ into consideration:

$$e_{n+1}(n+1) = [e_{q;n+1}, \ldots, e_{q;N}(n+1), 0, \ldots, 0]Q_N(n+1) \begin{bmatrix} 1 \\ 0 \\ \cdot \\ \cdot \\ \cdot \\ 0 \end{bmatrix}$$

The first column of $Q_N(n+1)$ may be clarified by observing that it is identical with that of $\hat{Q}_N(n+1)$ (cf. formula (6)).

Thus one writes:

$$Q_N(n+1) \begin{bmatrix} 1 \\ 0 \\ \cdot \\ \cdot \\ 0 \end{bmatrix} = \begin{bmatrix} \gamma_N(n+1) \\ 0 \\ \cdot \\ \cdot \\ G_N(n+1) \end{bmatrix} \quad (16)$$

where:

$$\gamma_N = \prod_{i=1}^{N} \cos\theta_i \quad (17)$$

$G_N(n+1)$ is a vector formed by the components $g_i(n+1)$:

$$\left. \begin{aligned} g_N(n+1) &= \sin\theta_1 \\ g_{N-1}(n+1) &= \sin\theta_2 \cos\theta_2 \\ \cdots &= \cdots \\ g_1(n+1) &= \sin\theta_N \prod_{i=1}^{N-1} \cos\theta_i \end{aligned} \right\} \quad (18)$$

An important equation of the following algorithm is derived therefrom:

$$e_{n+1}(n+1) = e(n+1) = e_{q;n+1} \cdot \gamma_N(n+1) \quad (19)$$

By implementing the recursion formula (6) and taking into consideration the equation (13), the following is obtained:

$$\begin{bmatrix} e_{q;n+1}(n+1) \\ \cdot \\ \cdot \\ e_{q;N}(n+1) \\ Y_q(n+1) \end{bmatrix} = \hat{Q}_N(n+1) \begin{bmatrix} y(n+1) \\ W^{1/2} \begin{bmatrix} e_{q;n}(n) \\ \cdot \\ \cdot \\ e_{q;N}(n) \\ Y_q(n) \end{bmatrix} \end{bmatrix} \quad (20)$$

From this matrix system a sub-system is taken which causes a matrix $Q_a(n+1)$ to occur; this matrix follows from the matrix $Q_N(n+1)$ by suppression of the rows and columns which only have zeroes and ones.

Thus, an important sub-system is obtained for the algorithm:

$$\begin{bmatrix} e_{q;n+1}(n+1) \\ Y_q(n+1) \end{bmatrix} = Q_a(n+1) \begin{bmatrix} y(n+1) \\ W^{1/2} Y_q(n) \end{bmatrix} \quad (21)$$

Whilst using the notions of forward and backward prediction, the matrix $T_{N+1}(n+1)$ is evaluated in two different manners.

Figure 2:
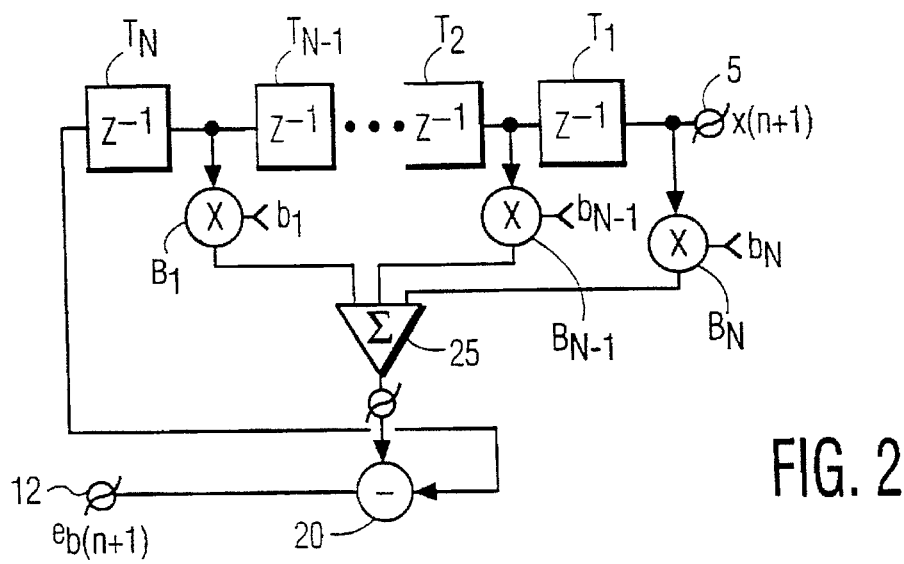
FIG. 2 represents a structure showing the backward prediction used for explaining the operation of the system according to the invention.

The diagram explaining this backward prediction is shown in drawing FIG. 2.

In this drawing FIG. 2 the samples of the signals to be processed $x(n+1)$ are always applied to terminal 5; the prediction is made in response to the samples of the delayed input signal $x(n+1-N)$. The delay by NT is produced by N delay elements $T_1, \ldots, T_N$. The result of the prediction is a signal $e_b(n+1)$ which appears at the terminal 12. This signal $e_b(n+1)$ comes from the subtracter 20 which subtracts the signal $x(n+1-N)$ from a signal coming from the adder 25. This adder 25 adds the results of the different multipliers $B_1$, $B_2, \ldots, B_N$ together. These multipliers are branched to the respective inputs of the delay circuits $T_N, \ldots, T1$. These multipliers $B_1, B_2, \ldots, B_N$ multiply the various samples by $b_1, b_2, \ldots, b_N$ respectively.

The backward prediction error is thus written as:

$$e_b(n+1) = x(n+1-N) - \sum_{p=0}^{N-1} b_{N-p} \cdot x(n+1-p) \quad (22)$$

A vector $V_{eb}$ may be caused to appear inspired by the formula (2) in which the signal $y(p)$ is replaced by $x(p-N)$ and $H(n+1)$ by $B_N(n+1)$:

$$V_{eb} = \begin{bmatrix} e_{b;n+1}(n+1) \\ W^{1/2}e_{b;n}(n+1) \\ \cdot \\ \cdot \\ \cdot \\ W^{(n+1)/2}e_{b;0}(n+1) \end{bmatrix} \quad (23)$$

$$= \begin{bmatrix} x(n+1-N) \\ W^{1/2}x(n-N) \\ \cdot \\ \cdot \\ \cdot \\ W^{(n+1)/2}x(-N) \end{bmatrix} - X_N(n+1)B_N(n+1)$$

By referring to formula (11), an error vector $V_{eq}$ is defined whose elements $e_{bq;i}(n+1)$ are such that they minimize its standard:

$$V_{ebq} = Q_N(n+1) \cdot V_{eb} = \begin{bmatrix} e_{bq;n+1}(n+1) \\ \cdot \\ \cdot \\ e_{bq;N}(n+1) \\ 0 \\ \cdot \\ \cdot \\ \cdot \\ 0 \end{bmatrix} \quad (24)$$

taking the definition of $X_{N+1}(n+1)$ of the equation (4), (23) and (24) into consideration, one may write:

$$Q_N(n+1) \cdot X_{N+1}(n+1) = \begin{bmatrix} 0 & e_{bq;n+1}(n+1) \\ \cdot & \cdot \\ \cdot & \cdot \\ 0 & e_{bq;N}(n+1) \\ T_N(n+1) & X_{bq;N}(n+1) \end{bmatrix} \quad (25)$$

where $$X_{bq;N}(n+1) = T_N(n+1) \cdot B_N(n+1) \quad (26)$$

The energy of the backward prediction $E_{bN}(n+1)$ is given by the following formula:

$$E_{bN}(n+1) = \sum_{p=0}^{n+1} W^p[x(p-N) - X^t(p) \cdot B_N(n+1)]^2 \quad (27)$$

and takes (24) into consideration $$E_{bN}(n+1) = \sum_{p=N}^{n} e_{bq;p}^2(n+1) \quad (28)$$

Now the matrix $T_{N+1}(n+1)$ is obtained by performing a series of cumulative rotations of the second term of the equation (25) and taking (28) into consideration $$T_{N+1}(n+1) = \begin{bmatrix} 0 \ldots 0 & E_{bN}^{1/2}(n+1) \\ T_N(n+1) & X_{bq;N}(n+1) \end{bmatrix} \quad (29)$$

and by mathematical induction:

$$T_{N+1} = \begin{bmatrix} 0 & 0 & \ldots & E_{bN}^{1/2}(n+1) \\ \cdot & \cdot & & \cdot \\ \cdot & \cdot & & \cdot \\ 0 & E_{b1}^{1/2} & \ldots & X_{bq;N}(n+1) \\ E_{b0}^{1/2}(n+1) & X_{bq;N}(n+1) & \ldots & \end{bmatrix} \quad (30)$$

Figure 3:
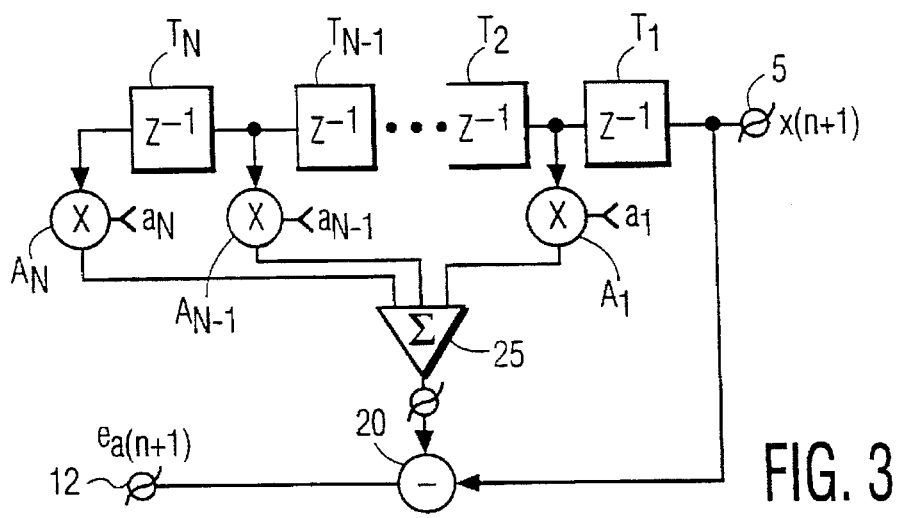
FIG. 3 represents a structure showing the forward prediction used for explaining the operation of the system according to the invention.

The diagram explaining this forward prediction is shown in drawing FIG. 3.

In this drawing Figure the samples of the signals to be processed $x(n+1)$ are always applied to terminal 5; the prediction is performed in response to the samples of the input signal $x(n+1)$. The result of the prediction is a signal $e_a(n+1)$ which appears at terminal 12. This signal $e_a(n+1)$ comes from the subtracter 20 which subtracts the signal $x(n+1)$ from a signal coming from the adder 25. This adder 25 adds up the results of the various multipliers $A_1, A_2, \ldots, A_N$. These multipliers are branched to the respective outputs of the delay elements $T_1, \ldots, T_N$. These multipliers $A_1, A_2, \ldots, A_N$ multiply the various samples by $a_1, a_2, \ldots, a_N$ respectively.

The forward prediction error is thus written as:

$$e_a(n+1) = x(n+1) - \sum_{p=1}^{N} a_p \cdot x(n+1-p) \quad (31)$$

There too a vector $V_{ea}$ may be caused to appear and the vector $V_{eaq}$ associated by means of the matrix $Q_N(n+1)$; by minimizing the standard of the vector $V_{eaq}$ the following equation is obtained:

$$\begin{bmatrix} Q_N(n) & 0 \\ 0 & 1 \end{bmatrix} \cdot X_{N+1}(n+1) = \begin{bmatrix} e_{aq;n+1}(n+1) & 0 & \ldots & 0 \\ \cdot & \cdot & & \cdot \\ \cdot & \cdot & & \cdot \\ e_{eq;N+1}(n+1) & & & \\ X_{aq;N} & T_N(n) & & \\ W^{n/2}x(0) & 0 & \ldots & 0 \end{bmatrix} \quad (32)$$

where:

$$X_{aq;N} = T_N(n+1) \cdot A_N \quad (33)$$

A set of rotations $Q_{ea}(n+1)$ performed on the second term of the previous equation accumulates the various $e_{aq;i}(n+1)$ by the element $W^{n/2}x(0)$ of the last row, so that the latter will contain, after accumulation, the energy of the forward prediction:

$$E_a^{1/2}(n+1) = W^{n/2}x(0) + e_{aq;n+1}^2 + e_{aq;n}^2 + \ldots \quad (34)$$

Subsequently, a rotation set $Q_\alpha(n+1)$ produces the matrix $T_{N+1}(n+1)$.

$$Q_\alpha(n+1) \begin{bmatrix} X_{aq;N}(n+1) & 0 & \ldots \\ \cdot & & \\ \cdot & T_N(n) & \\ E_a^{1/2}(n+1) & 0 & \ldots & 0 \end{bmatrix} = T_{N+1}(n+1) \quad (35)$$

This rotation matrix may be explained as:

$$Q_\alpha(n+1) = \begin{bmatrix} \cos\alpha_N & \ldots & 0 & \ldots & -\sin\alpha_N \\ \cdot & & \cdot & & \cdot \\ \cdot & & \cdot & & \cdot \\ \cdot & & \cdot & & \cdot \\ 0 & \ldots & 1 & \ldots & 0 \\ \sin\alpha_N & \ldots & 0 & \ldots & \cos\alpha_N \end{bmatrix} \ldots \quad (36)$$

$$\begin{bmatrix} 1 & \ldots & 0 & \ldots & 0 \\ 0 & \ldots & 1 & \ldots & 0 \\ \ldots & 0 & \ldots & \cos\alpha_1 & -\sin\alpha_1 \\ \ldots & 0 & \ldots & \sin\alpha_1 & \cos\alpha_1 \end{bmatrix}$$

This may be narrowed down to:

$$\begin{bmatrix} I_{n-N+1} & 0 \\ 0 & Q_\alpha(n+1) \end{bmatrix} \cdot Q_{ea}(n) \cdot \begin{bmatrix} Q_N(n) & 0 \\ 0 & 1 \end{bmatrix} = Q_{N+1}(n+1) \quad (37)$$

The following quantity is evaluated:

$$Q_{N+1}(N+1) \begin{bmatrix} 1 \\ 0 \\ \vdots \\ 0 \end{bmatrix} \quad (38)$$

With formula (16):

$$\begin{bmatrix} Q_N(n) & 0 \\ 0 & 1 \end{bmatrix} \begin{bmatrix} 1 \\ 0 \\ \vdots \\ 0 \end{bmatrix} = \begin{bmatrix} \gamma_N(n) \\ 0 \\ \vdots \\ 0 \\ G_N(n) \\ 0 \end{bmatrix} \quad (39)$$

Then, taking account of the fact that in this case the matrix $Q_{ea}(n+1)$ takes part for only a single rotation:

$$Q_{ea}(n+1) \begin{bmatrix} \gamma_N(n+1) \\ 0 \\ \vdots \\ 0 \\ G_N(n+1) \\ 0 \end{bmatrix} = \begin{bmatrix} \gamma_N(n) \cdot W^{1/2} E_a^{1/2}(n)/E_a^{1/2}(n+1) \\ 0 \\ \vdots \\ 0 \\ G_N(n) \\ \gamma_N(n) e_{aq}(n+1)/E_a^{1/2}(n+1) \end{bmatrix} \quad (40)$$

When establishing that the matrix $Q_\alpha(n+1)$ effects only the N+1 terms at the bottom of the preceding equation, one may write:

$$Q_\alpha(n+1) \begin{bmatrix} G_N(n) \\ \gamma_N(n) e_{aq}(n+1)/E_{aN}^{1/2}(n+1) \end{bmatrix} = \begin{bmatrix} g_{N+1}(n+1) \\ G_N(n+1) \end{bmatrix} \quad (41)$$

The quantity given to the equation (38) is thus determined.

In the following, $X_q$ and $X_{aq}$ will be interchanged.

ALGORITHM 1) prediction part

1st STAGE $$\begin{bmatrix} e_{aq}(n+1) \\ X_q(n+1) \end{bmatrix} = Q_c(n) \begin{bmatrix} x(n+1) \\ W^{1/2} X_q(n) \end{bmatrix} \quad (42)$$

This stage follows from formula (21) while the obvious substitutions are made:

2nd STAGE $$E_a(n+1) = W E_a(n) + e_{aq}^2(n+1) \quad (43)$$

This stage follows from formula (34):

3rd STAGE $$\begin{bmatrix} 0 \\ E_{b0}^{1/2}(n+1) \end{bmatrix} = Q_\alpha(n+1) \begin{bmatrix} X_q(n+1) \\ E_a^{1/2}(n+1) \end{bmatrix} \quad (44)$$

This stage is inferred by making the two expressions of $T_{N+1}(n+1)$ obtained in the equations (30) and (35) identical:

4th STAGE and 5th STAGE $$\alpha_2 = \gamma_N(n) e_{aq}(n+1)/E_a^{1/2}(n+1) \quad (45)$$

$$\begin{bmatrix} \alpha_1 \\ G_N(n+1) \end{bmatrix} = Q_c(n+1) \begin{bmatrix} G_N(n) \\ \alpha_2 \end{bmatrix} \quad (46)$$

These two stages follow from the equation (41) in which is assumed:

$$\alpha_1 = g_{N+1}(n+1)$$

6th STAGE $$\begin{bmatrix} \gamma_N(n+1) \\ G_N(n+1) \end{bmatrix} = Q_c(n+1) \begin{bmatrix} 1 \\ 0 \\ \vdots \end{bmatrix} \quad (47)$$

This stage follows from the equation (16) in which the matrix $Q_N(n+1)$ has been substituted by the matrix $Q_a(n+1)$ and the left-hand vector has been cleared of its useless zeroes.

2) filter part

1st STAGE $$\begin{bmatrix} e_q(n+1) \\ Y_q(n+1) \end{bmatrix} = Q_c(n+1) \begin{bmatrix} y(n+1) \\ W^{1/2} Y_q(n) \end{bmatrix} \quad (48)$$

This stage directly follows from the formula (21).

2nd STAGE $$e(n+1) = \gamma_N(n+1) e_q(n+1) \quad (49)$$

The latter stage follows directly from formula (19).

3) updating the matrices

1-UPDATING THE MATRIX $Q_\alpha$

This matrix is defined by the formula (35). It makes the different components of $X_{aq}$ equal to zero by cumulating them on the last line of the matrix. In a relatively simple manner it may thus be demonstrated that:

$$\sin \alpha_i = \frac{X_{aq;i}}{\sqrt{X_{aq;i}^2 + \sum_{k=1}^{i-1} X_{aq;k}^2 + E_a(n+1)}} \quad (50)$$

The cosines are derived in customary fashion.

2-UPDATING THE MATRIX $Q_a$

This matrix is formed by significant elements (the sines and cosines) of the matrix $Q_N(n+1)$ explained by the equation (7). The value of these different sines and cosines results from the stage denoted by the formula (46) which provides the set of components of the vector $G_N$; one thus obtains the value of the different sines by referring to the formulas (17) and (18):

$$\left. \begin{array}{l} \sin \theta_i = g_{N-i}/\gamma_i \\ \gamma_{i+1} = \gamma_i \cos \theta_i \end{array} \right\} \quad (51)$$

whilst the cosines are derived in customary fashion.

Figure 4:
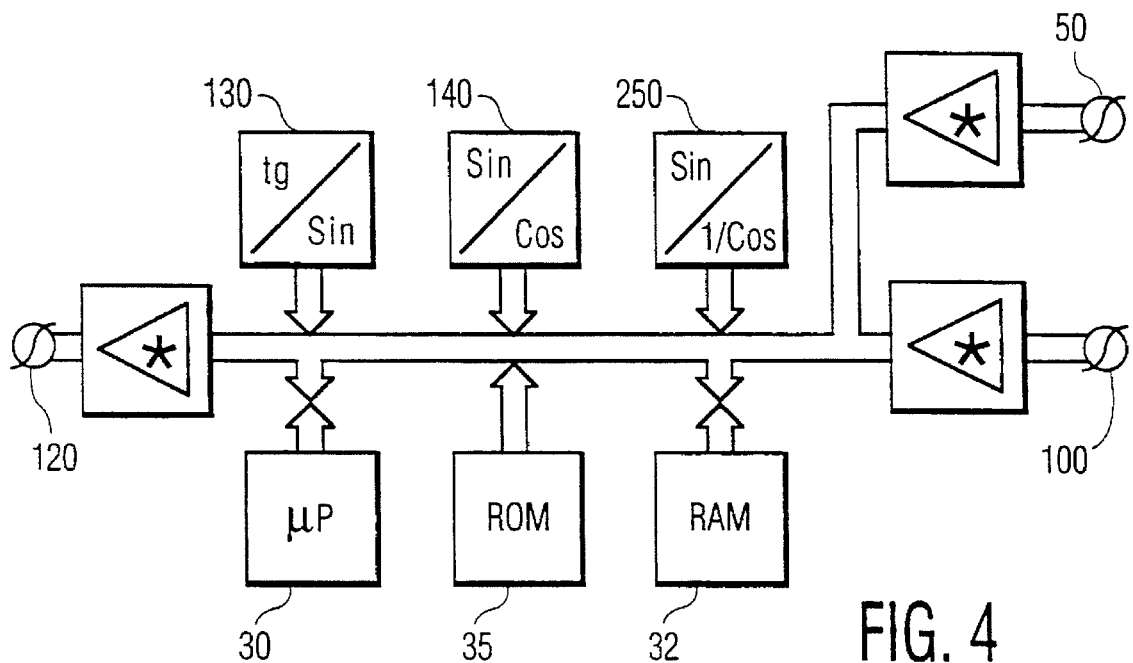
FIG. 4 shows an embodiment of a system according to the invention.

For implementing the invention the system diagrammatically shown in drawing FIG. 4 is used. This system is formed on the basis of a signal processor of the TMS 320 type, for example, carrying reference character 30 in this drawing Figure; around this processor are found a set of RAM memories referenced 32 which contain data, and a ROM memory 35 which contains, more specifically, the operation program. An input 50 receives the data to be filtered or predicted x(n+1), an input 100 the reference data y(n+1) in the case of filtering, and an access 120 for presenting the filtered or predicted data.

In accordance with the invention the system comprises:

normalizing means for normalizing the input signal which determines sinusoidal values having an angle γ determined by the following equation:

$$\begin{bmatrix} 0 \\ E_0^{1/2}(n+1) \end{bmatrix} = \begin{bmatrix} \cos\psi & -\sin\psi \\ \sin\psi & \cos\psi \end{bmatrix} \begin{bmatrix} x(n+1) \\ W^{1/2}E_0^{1/2}(n) \end{bmatrix} \quad (52)$$

Then, after this normalization, the invention proposes to make the following substitutions:

a) formula (42)

$$\left.\begin{aligned} x(n+1) \to \sin\psi &= \frac{x(n+1)}{E_0^{1/2}(n+1)} \\ X_q(n) \to X_q'(n) &= \frac{X_q(n)}{E_0^{1/2}(n)} \\ W^{1/2}X_q(n) \to \cos\psi \cdot X_q'(n) &= \frac{W^{1/2}X_q(n)}{E_0^{1/2}(n)} \cdot \frac{E_0^{1/2}(n)}{E_0^{1/2}(n+1)} \\ e_{aq}(n+1) \to e_{aq}' &= \frac{e_{aq}}{E_0^{1/2}(n+1)} \end{aligned}\right\} \quad (53)$$

b) formula (43)

This formula is no longer necessary.

c) formula (44)

This formula is transformed by applying above substitutions and adding the following:

$$E_a^{1/2}(n+1) \to E_a'^{1/2}(n+1) = \frac{E_a^{1/2}(n+1)}{E_0^{1/2}(n+1)} \quad (54)$$

$$\begin{bmatrix} X_q'(n+1) \\ E_a'^{1/2}(n+1) \end{bmatrix} = Q_\alpha^{-1}(n+1) \begin{bmatrix} 0 \\ \cdot \\ \cdot \\ 0 \\ 1 \end{bmatrix} \quad (55)$$

Since the matrix $Q_\alpha(n+1)$ is orthogonal, its inverse is equal to its transpose, that is to say, the inverse is derived by permuting the rows and columns.

d) formula (45)

This formula remains valid after the substitutions already indicated.

e) formulas (46) to (51)

They remain identical.

The algorithm according to the invention may thus be summarized:

1) Initialization the values of the cosines are set at "1"

the values of the sines are set at "0"

the $X'_q$ are set at "0"

the $Y_q$ are set at "0"

2) Normalization

See formula (52).

3) Prediction a)

$$\begin{bmatrix} e_{aq}'(n+1) \\ X_q'(n+1) \end{bmatrix} = Q_\alpha(n) \begin{bmatrix} \sin\psi \\ \cos\psi \cdot X_q'(n) \end{bmatrix} \quad (56)$$

b) updating of $Q_\alpha(n+1)$ c)

$$\begin{bmatrix} X_q'(n+1) \\ E_a'^{1/2}(n+1) \end{bmatrix} = Q_\alpha^{-1} \begin{bmatrix} 0 \\ \cdot \\ \cdot \\ 0 \\ 1 \end{bmatrix} \quad (57)$$

d)

$$\alpha_2 = \gamma_N \cdot e'_{aq}(n+1)/E_a^{1/2}(n+1) \quad (58)$$

e)

$$\begin{bmatrix} g_{N+1}(n+1) \\ G_N(n+1) \end{bmatrix} = Q_\alpha(n+1) \begin{bmatrix} G_N(n) \\ \alpha_2 \end{bmatrix} \quad (59)$$

f) updating of $Q_a(n+1)$ g)

$$\begin{bmatrix} \gamma_N(n+1) \\ G_N(n+1) \end{bmatrix} = Q_a(n+1) \begin{bmatrix} 1 \\ 0 \\ \cdot \\ \cdot \\ 0 \end{bmatrix} \quad (60)$$

h) filtering $$\begin{bmatrix} e_q(n+1) \\ Y_q(n+1) \end{bmatrix} = Q_a(n+1) \begin{bmatrix} y(n+1) \\ W^{1/2}Y_q(n) \end{bmatrix} \quad (61)$$

According to another aspect of the invention a first Table of sinusoidal values 130 is provided which supplies, for example, a sine value on the basis of a tangential value. It will be evident that this Table containing values in a read-only memory can be included in the read-only memory 35.

According to a further aspect of the invention a second Table of sinusoidal values 140 is provided which supplies a cosine value as a function of a sine value. The remarks made above as to memory 130 apply here too.

According to a still further aspect of the invention there is provided a third Table of sinusoidal values 250 which supplies an inverse cosine value as a function of a sine value.

This characteristic is made use of if the following substitutions are made:

$$\left.\begin{aligned} \gamma &= \gamma \to \frac{1}{\gamma} \\ \cos\theta_i &\to \frac{1}{\cos\theta_i} \end{aligned}\right\} \quad (62)$$

Thus, as a result of the presence of these Tables, a large number of divisions are omitted and no square root extraction whatsoever is necessary.

Figure 5:
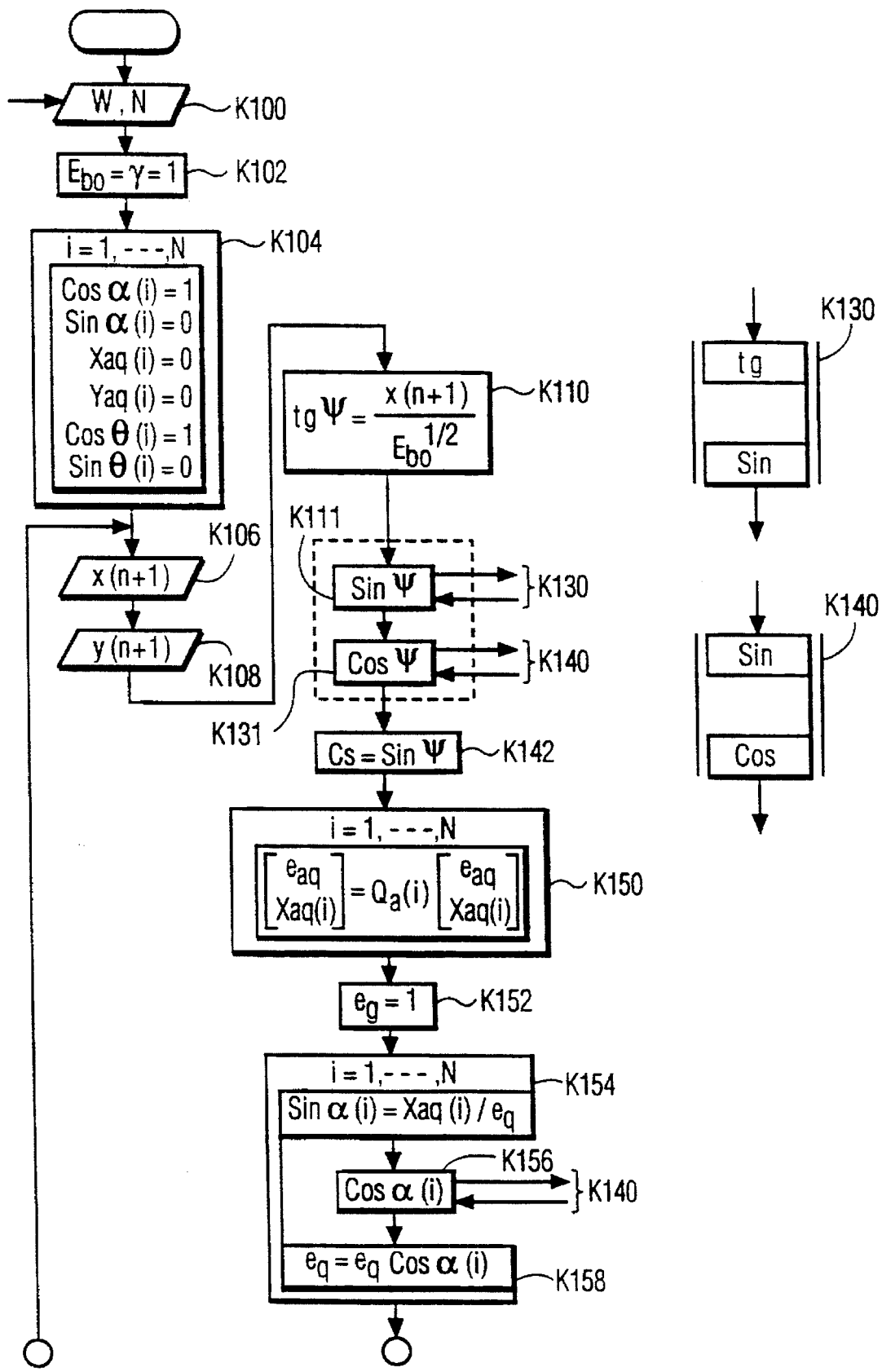
FIGS. 5 and 6 represent flow charts of the operation of the system shown in FIG. 4.
Figure 6:
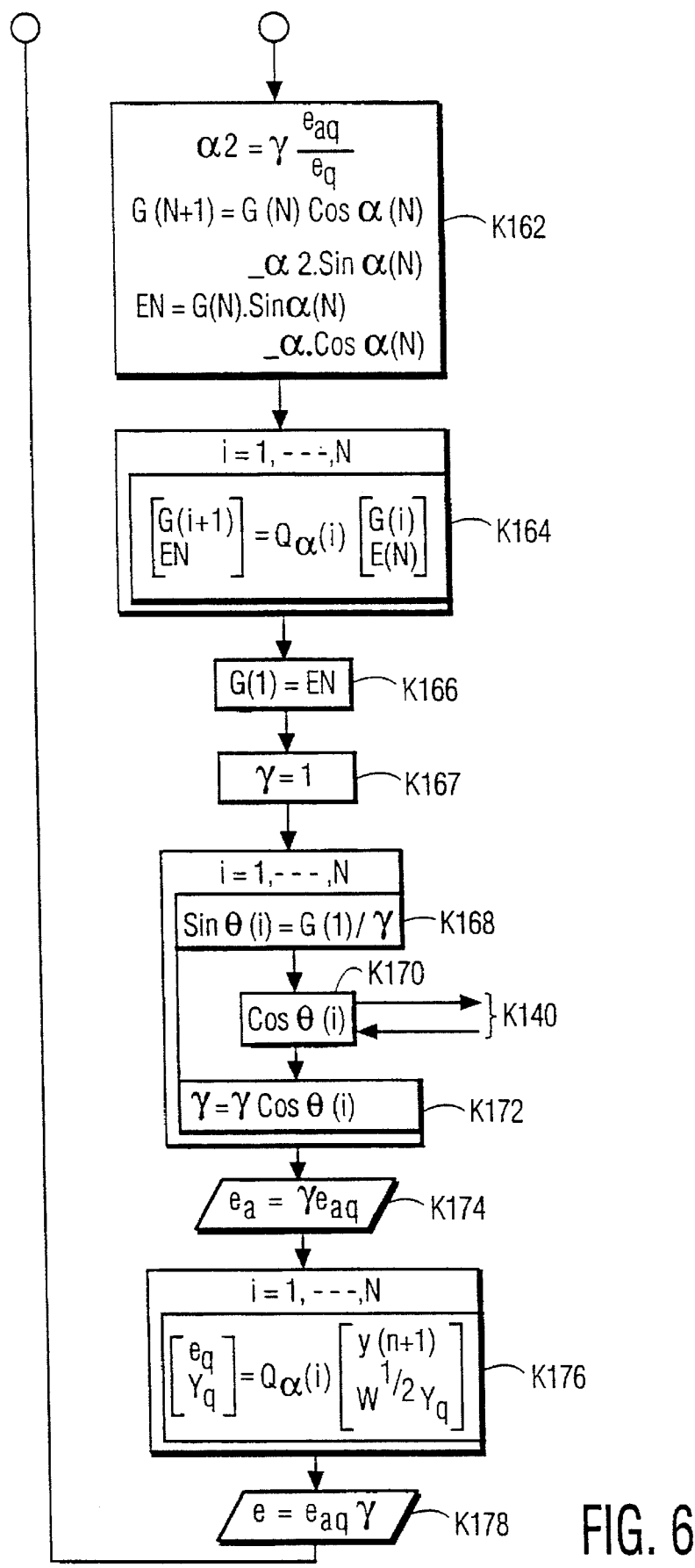

The various means according to the invention are obtained in an advantageous manner by way of a program contained in the memory 35. The flow chart of this program is shown in FIGS. 5 and 6.

This flow chart starts with a box K100 where the values N (filter order) and W (weighting factor) are fed. The values $E_{bo}$ and γ are initialized at 1 in box K102. Box K104 indicates an initialization of various values indexed i, where i varies from 1 to N; the cosine of the angles $\theta_i$ and $\alpha_i$ are set at 1, whereas their sines are set at 0; the values $X_{aq(i)}$ and $Y_{aq(i)}$ are also set at 0. Boxes K106 and K108 represent the respective values x(n+1) and y(n+1) which are read through the inputs 50 and 100. Then starts the normalizing stage indicated in box K110; this phase starts with the calculation of the quotient of the sample value and the value of the square root $E_{bo}$ which provides the tangential value of the angle ψ. By addressing the Table 130, the value sine ψ is obtained, which is indicated in box K111 and the operation performed by the Table is denoted by K130. For obtaining the cosine, the Table 140 is addressed which is indicated in box K131, and the operation of the Table 140 is indicated in box K140. Then, in box K142 an additional variable "es" is used which adopts the value sin ψ. Box K150 indicates the calculation of $e_{aq}$ and $X_{aq(i)}$ in accordance with the formula (12). This formula may also be explained in the following manner based on the standards of the FORTRAN language.

DO I=1,N $e_{aq}$=es es=$e_{aq}$.cos θ(I)–cos ψ.$X_{aq}$(I).sin θ(I)

$X_{aq}$(I)=$e_{aq}$.sin ψ(I)+cos ψ.$X_{aq}$(I).cos θ(I)

CONTINUE

Before entering upon another treatment, the variable $e_q$ is initialized at 1, box K152. This other treatment shown in box K154 consists of determining the sine of the various angles α(I) by evaluating the quantities given in formula (50). The value of the associated cosine is obtained with reference to Table 140, box K156. Box K158 provides the value $e_q$ (this is the value $E_q^{1/2}(n+1)$ of the formula). Then, in box K162, drawing FIG. 6, the quantities given by the formula (45) are determined; in box K164 the N values indicated by the formula (46) are evaluated.

This formula can be explained by:

DO I=2,N

G(N+2–I)=G(N+1–I).cos α(N+1–I)–EN.sin α(N+1–I)

EN1=G(N+1–I).sin α(N+1–I)+EN.cos α(N+1–I)

EN=EN1

CONTINUE

Box K166 specifies the value G(1), after which, in box K167, the value γ is initialized. Boxes K168, K169 and K170 represent the updating of the matrix $Q_a$(n+1). Reference is made to box K170 which supplies the value of the cosine by calling same with the value of the sine of the Table shown in box K140.

The value γ is then used for supplying the value e(n+1) (box K174).

The filtering is performed in box K176 according to the following process:

DO I=1,N $E_q$=$e_a$ $e_a$=$E_q$.cos θ(I)–$W^{1/2}Y_q$(I)sin θ(I)

$Y_q$(I)=Eq. sin θ(I)+$W^{1/2}Y_q$(I). cos θ(I)

CONTINUE

Box K178 provides the result of the filtering.

Figure 7:
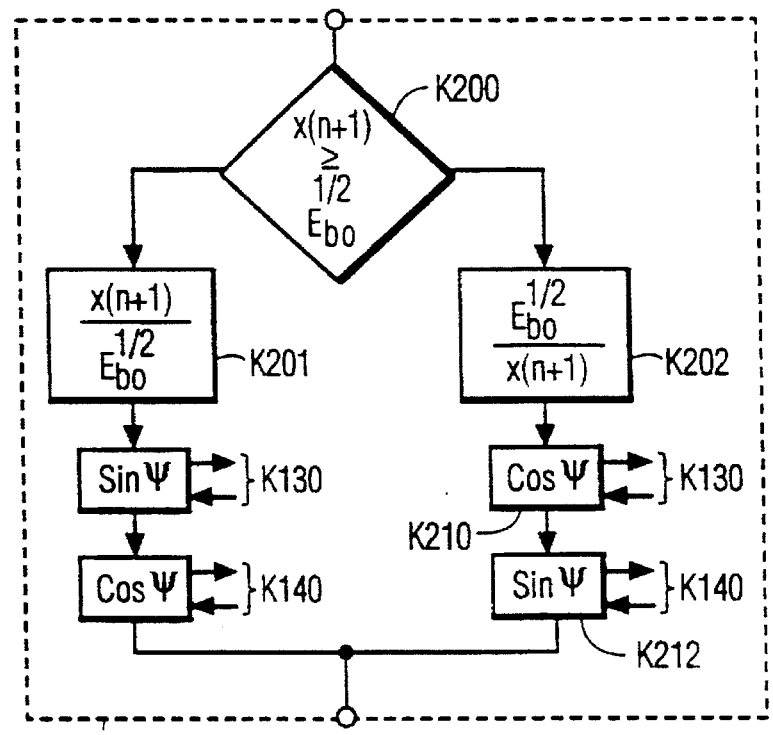
FIG. 7 shows a detail of the flow charts of the FIGS. 5 and 6.

In drawing FIG. 7 a variant of the embodiment of the normalizing stage is shown; this stage has for its object to limit the size of the Table K130. This variant replaces boxes K110 and K111 of the flow chart shown in drawing FIG. 5. Box K200 is a test of x(n+1) relative to $E_{bo}^{1/2}$ for performing a division, boxes K201, K202, so that the result is lower than "1". If the operation of box K201 is carried out, the value tg ψ is obtained; the rest of the operations is identical with those of drawing FIG. 5. If the operation of box K202 is carried out, the value 1/tg ψ is obtained; for obtaining the cosine of this angle, the Table K130 is accessed and for obtaining the sine the Table K140 is accessed.

Figure 8:
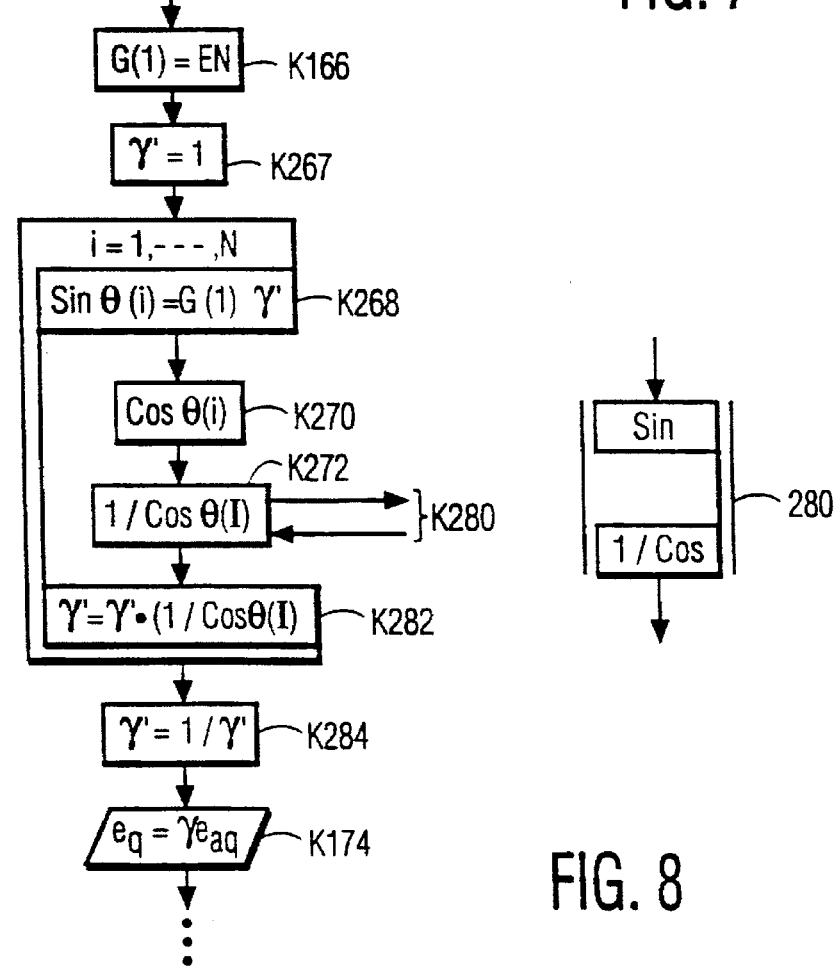
FIG. 8 shows part of the flow chart modified for using a variant of an embodiment of the invention.

Drawing FIG. 8 shows how the matrix $Q_a$ can be updated whilst divisions are avoided. This part of the flow chart replaces the part of the flow chart shown in drawing FIG. 6 situated between boxes K166 and K174. Box K267 denotes the initialization of a parameter γ'. Then, box K268 denotes the determination of the sines of the angle θ, box K270 refers to Table K115 for the storage of the various cosines of this angle, then in box K272 a further Table K280 is used which supplies the inverse of the cosine as a function of the sine. In box K282 the coefficient γ is determined. At the end of the iteration the value γ is restored whilst the observation is made that these values are each other's inverses (box K284).

Figure 9:
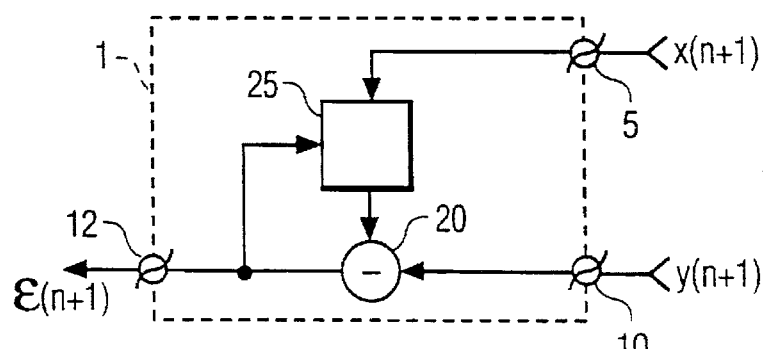
FIG. 9 shows an application to the prediction of the system according to the invention.

In drawing FIG. 9 the use of the invented system in the capacity of a filter is shown. In this drawing Figure can be seen that the filter error signal e(n+1) at terminal 12 controls the circuit 25, so that the latter has or simulates the desired filter response in conformity with the samples y(n+1) applied to the input 10.

Figure 10:
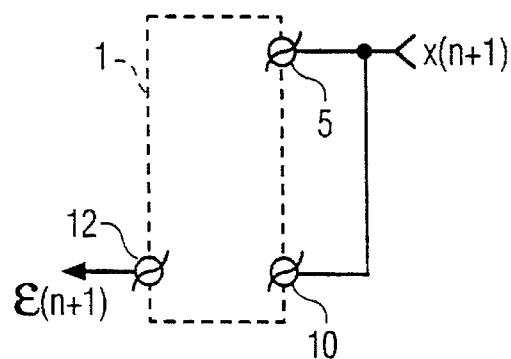
FIG. 10 shows an application to the filmring of the system according to the invention.

In drawing FIG. 10 the represented use is the prediction. Therefore, the input sample is applied to both the input 5 and the input 10. These prediction techniques are applied to information compression techniques because the more precise the prediction is the less necessary it becomes to transmit the samples x(n+1).

I claim:

1. Signal processing system for implementing a least squares calculation, this system comprising:

an input for receiving a sample x(n+1) at an instant n+1, another input for receiving at the instant a reference sample y(n+1), calculation means for minimizing a signal e(n+1) that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions wherein the normalizing means normalizes the received samples by a normalization factor $E_0^{1/2}(n+1)$, by determining an angle ψ and the factor $E_0^{1/2}(n+1)$, as a function of a previous factor $E_0^{1/2}(n)$ and the received sample, by resolving:

$$\begin{bmatrix} 0 \\ E_0^{1/2}(n+1) \end{bmatrix} = \begin{bmatrix} \cos\psi & -\sin\psi \\ \sin\psi & \cos\psi \end{bmatrix} \begin{bmatrix} x(n+1) \\ W^{1/2}E_0^{1/2}(n) \end{bmatrix}$$

where $W^{1/2}$ is an omission factor.

2. Signal processing system for implementing a least squares calculation, this system comprising:

an input for receiving a sample x(n+1) at an instant n+1, another input for receiving at the instant a reference sample y(n+1), calculation means for minimizing a signal e(n+1) that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions, and wherein the calculation means comprises prediction means:

a) for evaluating the following quantities $$\begin{bmatrix} e_{aq}'(n+1) \\ X_q'(n+1) \end{bmatrix} = Q_a(n) \begin{bmatrix} \sin\psi \\ \cos\psi \cdot X_q'(n) \end{bmatrix}$$

where $e'_{aq}$ is a transformed prediction error and $X'_q$ is a transformed input sample vector, b) for updating the rotation matrix $Q_\alpha$, c) for evaluating the quantity $E_a(n+1)$ on the basis of the following equation:

$$\begin{bmatrix} X_q'(n+1) \\ E_a^{1/2}(n+1) \end{bmatrix} = Q_a^{-1} \begin{bmatrix} 0 \\ \vdots \\ 0 \\ 1 \end{bmatrix}$$

where $Q_\alpha^{-1}$ is the inverse matrix of the matrix $Q_\alpha$, d) for evaluating the quantity $\alpha_2$ which is a normalized prediction error:

$$\alpha_2 = \gamma_N \cdot e'_{aq}(n+1) E_a^{1/2}(n+1)$$

where $\gamma_N$ is the filter-error to prediction-error ratio, e) for evaluating the quantities:

$$\begin{bmatrix} g_{N+1}(n+1) \\ G_N(n+1) \end{bmatrix} = Q_\alpha(n+1) \begin{bmatrix} G_N(n) \\ \alpha_2 \end{bmatrix}$$

where $g_{N+1}$ is a component of an additional vector and $G_N$ is the transformed unit vector, f) for updating the matrix $Q_a$, and g) for evaluating the quantities:

$$\begin{bmatrix} \gamma_N(n+1) \\ G_N(n+1) \end{bmatrix} = Q_a(n+1) \begin{bmatrix} 1 \\ 0 \\ \vdots \\ 0 \end{bmatrix}$$

3. Signal processing system as claimed in claim 2, used as a filter, characterized in that the prediction means are provided for evaluating:

$$\begin{bmatrix} e_q(n+1) \\ Y_q(n+1) \end{bmatrix} = Q_a(n+1) \begin{bmatrix} y(n+1) \\ W^{1/2} Y_q(n) \end{bmatrix}$$

and for producing a filter error $e(n+1)$:

$$e(n+1) = \gamma(n+1) e_q(n+1).$$

4. Signal processing system for implementing a least squares calculation, this system comprising:

an input for receiving a sample $x(n+1)$ at an instant $n+1$, another input for receiving at the instant a reference sample $y(n+1)$, calculation means for minimizing a signal $e(n+1)$ that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions, wherein the calculation means comprises initialization means for setting:

= the cosine values at "1"

= the sine values at "0"

= values of the components of the vector $X'_q$ being a transformed input sample vector at "0"

= values of the components of the vector $Y_q$ being a transformed reference sample vector at "0", and wherein prediction means are additionally provided for supplying the prediction error signal $e(n+1)$ by evaluating the quantity:

$$e(n+1) = \gamma(n) e'_{aq}(n+1).$$

5. Signal processing system for implementing a least squares calculation, this system comprising:

an input for receiving a sample $x(n+1)$ at an instant $n+1$, another input for receiving at the instant a reference sample $y(n+1)$, calculation means for minimizing a signal $e(n+1)$ that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions, and wherein the calculation means comprise updating means for updating the rotation matrix $Q_\alpha$ causing angles $\alpha_i$ to occur by evaluating:

$$\sin\alpha_i = \frac{X_{aq;i}}{\sqrt{x_{aq;i}^2 + \sum_{k=1}^{i-1} X_{aq;k}^2 + E_a(n+1)}}$$

where $X_{aq;i}$ are the various components of the vector $X_q$.

6. Signal processing system for implementing a least squares calculating, this system comprising:

an input for receiving a sample $x(n+1)$ at an instant $n+1$, another input for receiving at the instant a reference sample $y(n+1)$, calculation means for minimizing a signal $e(n+1)$ that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions, and wherein the calculation means comprise updating means for updating the rotation matrix $Q_a$ causing angles $\theta_1$ to occur by evaluating:

$$\left. \begin{array}{l} \sin\theta_i = g_{N-i}/\gamma_i \\ \gamma_{i+1} = \gamma_i \cos\theta_i \end{array} \right\}$$

where $g_{N-i}$ is the $N^{ith}$ component of the transformed unit vector.

7. Signal processing system for implementing a least squares calculation, this system comprising:

an input for receiving a sample x(n+1) at an instant n+1, another input for receiving at the instant a reference sample y(n+1), calculation means for minimizing a signal e(n+1) that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions, and wherein there is provided the Table whose input is a tangent and whose output a sine, a second Table whose input is a sine and whose output is a cosine.

8. Signal processing system for implementing a least squares calculation, this system comprising an input for receiving a sample x(n+1) at an instant n+1, another input for receiving at the instant a reference sample y(n+1), calculation means for minimizing a signal e(n+1) that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions, and wherein there is provided the Table for updating the matrix $Q_a$, the input of this Table being a sine and its output a cosine, whereas the updating means of the matrix $Q_a$ evaluate:

$$\left. \begin{array}{l} \sin\theta_i = g_{N-i} \cdot \gamma_i' \\ \gamma_{i+1}' = \gamma_i' \cdot (1/\cos\theta_i) \end{array} \right\}$$

and $\gamma_N = 1/\gamma'_N$.

9. Signal processing system for implementing a least squares calculation, this system comprising:

an input for receiving a sample x(n+1) at an instant n+1, another input for receiving at the instant a reference sample y(n+1), calculation means for minimizing a signal e(n+1) that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received sample relative to a function of energy, and memory means for storing a table of the trigonometric functions and for interacting with the calculating means which is for evaluating the trigonometric functions.

10. Signal processing system as claimed in claim 9, characterized in that the calculation means comprise initialization means for setting:

the cosine values at "1"

the sine values at "0"

values of the components of the vector $X'_q$ being a transformed input sample vector at "0"

values of the components of the vector $Y_q$ being a transformed reference sample vector at "0".

11. The system of claim 9, wherein the memory means is a read only memory.

12. The system of claim 9 wherein the memory means comprises means for storing a table of sine values addressable by tangential values.

13. The system of claim 12 wherein the means for storing is a read only memory.

14. The system of claim 9 wherein the memory means comprises means for storing a table of cosine values addressable by sine values.

15. The system of claim 14 wherein the means for storing is a read only memory.

16. The system of claim 9 wherein the memory means comprises means for storing inverse cosine values as a function of sine values.

17. The system of claim 16 wherein the means for storing is a read only memory.

18. The system of claim 9 wherein the memory means comprises first means for storing a table of sine values addressable by tangential values;

second means for storing a table of cosine values addressable by sine values; and third means for storing a table of inverse cosine values addressable by sine values.

19. The system of claim 18, wherein the first, second, and third means for storing are first, second, and third read only memories, respectively.

20. Signal processing system for performing echo cancelling using a least squares calculation, said system comprising:

an input for receiving a sample x(n+1) at an instant n+1, another input for receiving at the instant a reference sample y(n+1), calculation means for performing echo cancelling by minimizing a signal e(n+1) that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions, and wherein the normalizing means normalizes the received samples by a normalization factor $E_o^{1/2}(n+1)$, by determining an angle $\psi$ and the factor $E_0^{1/2}(n+1)$, as a function of a previous factor $E_0^{1/2}(n)$ and the received sample, by resolving:

$$\begin{bmatrix} 0 \\ E_0^{1/2}(n+1) \end{bmatrix} = \begin{bmatrix} \cos\psi & -\sin\psi \\ \sin\psi & \cos\psi \end{bmatrix} \begin{bmatrix} x(n+1) \\ W^{1/2}E_0^{1/2}(n) \end{bmatrix}$$

where $W^{1/2}$ is an omission factor.

21. Signal processing system for eliminating radio communication multipaths using a least squares calculation, said system comprising:

an input for receiving a sample $x(n+1)$ at an instant $n+1$, another input for receiving at the instant a reference sample $y(n+1)$, calculation means for eliminating radio communication multipaths by minimizing a signal $e(n+1)$ that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions wherein the normalizing means normalizes the received samples by a normalization factor $E_0^{1/2}(n+1)$, by determining an angle $\psi$ and the factor $E_0^{1/2}(n+1)$, as a function of a previous factor $E_0^{1/2}(n)$ and the received sample, by resolving:

$$\begin{bmatrix} 0 \\ E_0^{1/2}(n+1) \end{bmatrix} = \begin{bmatrix} \cos\psi & -\sin\psi \\ \sin\psi & \cos\psi \end{bmatrix} \begin{bmatrix} x(n+1) \\ W^{1/2}E_0^{1/2}(n) \end{bmatrix}$$

where $W^{1/2}$ is an omission factor.

22. Signal processing system for performing signal prediction using a least squares calculation, said system comprising:

an input for receiving a sample $x(n+1)$ at an instant $n+1$, another input for receiving at the instant a reference sample $y(n+1)$, calculation means for performing signal prediction by minimizing a signal $e(n+1)$ that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions wherein the normalizing means normalizes the received samples by a normalization factor $E_0^{1/2}(n+1)$, by determining an angle $\psi$ and the factor $E_0^{1/2}(n+1)$ as a function of a previous factor $E_0^{1/2}(n)$ and the received sample, by resolving:

$$\begin{bmatrix} 0 \\ E_0^{1/2}(n+1) \end{bmatrix} = \begin{bmatrix} \cos\psi & -\sin\psi \\ \sin\psi & \cos\psi \end{bmatrix} \begin{bmatrix} x(n+1) \\ W^{1/2}E_0^{1/2}(n) \end{bmatrix}$$

where $W^{1/2}$ is an omission factor.

23. Signal processing system for performing adaptive filtering using a least squares calculation, said system comprising:

an input for receiving a sample $x(n+1)$ at an instant $n+1$, another input for receiving at the instant a reference sample $y(n+1)$, calculation means for performing adaptive filtering by minimizing a signal $e(n+1)$ that represents a difference between the received sample and the reference sample, the calculation means operating according to a least squares calculation that utilizes rotation matrices $Q_a$ and $Q_\alpha$, the matrices being related to trigonometric functions, the calculation means comprising normalizing means for normalizing the received samples relative to a function of their energy, and memory means for storing a table of the trigonometric functions and for interacting with the calculating means which is for evaluating the trigonometric functions wherein the normalizing means normalizes the received samples by a normalization factor $E_0^{1/2}(n+1)$ by determining an angle $\psi$ and the factor $E_0^{1/2}(n+1)$, as a function of a previous factor $E_0^{1/2}(n)$ and the received sample by resolving:

$$\begin{bmatrix} 0 \\ E_0^{1/2}(n+1) \end{bmatrix} = \begin{bmatrix} \cos\psi & -\sin\psi \\ \sin\psi & \cos\psi \end{bmatrix} \begin{bmatrix} x(n+1) \\ W^{1/2}E_0^{1/2}(n) \end{bmatrix}$$

where $W^{1/2}$ is an omission factor.

\* \* \* \* \*